3,519,639
IMIDAZOLYL PHOSPHATES AND PHOSPHOROTHIOATES

Paul B. Budde and Henry Tolkmith, Midland, Mich., assignors to The Dow Chemical Company, Midland, Mich., a corporation of Delaware
No Drawing. Continuation-in-part of application Ser. No. 604,177, Dec. 23, 1966. This application May 24, 1968, Ser. No. 731,745
Int. Cl. C07d 49/36
U.S. Cl. 260—309         5 Claims

ABSTRACT OF THE DISCLOSURE

Disclosed are (a) imidazolyl phosphates and phosphorothioates wherein the phosphorus atom additionally bears two substituted phenoxy groups or one substituted phenoxy group and a lower alkylamino group or substituted phenyl group and (b) diimidazolyl phosphates and phosphorothioates wherein the phosphorus atom additionally bears a substituted phenoxy group in which, in each instance, the substituents are from 1 to 3 independent bomo, chloro, cyano, nitro, loweralkoxy, or loweralkyl groups. These compounds are useful as bactericides and fungicides.

---

This is a continuation-in-part of the application which is identified as Ser. No. 604,177, filed Dec. 23, 1966 now abandoned.

The present invention is concerned with imidazolyl and diimidazolyl phosphates and phosphorothioates of the formulas

I

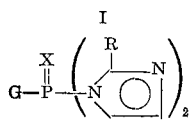

and

II

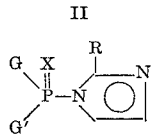

In the above and succeeding formulas in the present specification and claims, each X and X' represents oxygen or sulfur, R represents hydrogen or loweralkyl; each G represents a radical of the formula

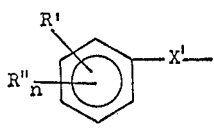

and G' represents G, loweralkylamino, or aryl of the formula

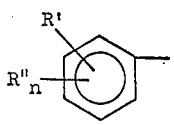

wherein each R' represents bromo, chloro, cyano, nitro, or loweralkoxy; each R" represents bromo, chloro, or loweralkyl and n represents an integer 0, 1, or 2. In the present specification and claims, the terms "loweralkyl" and "loweralkoxy" wherever employed herein designates alkyl and alkoxy, radicals, respectively, whereof the alkyl portion is an alkyl radical being from 1 to 2, to 3, and up to and including 4 carbon atoms and 1 and 2 and 3 and 4 carbon atoms. The term "loweralkylamino" denotes amino groups in which the alkyl portion is similarly of 1 to 4 carbon atoms. Representative "loweralkylamino" groups include methylamino, dimethylamino, ethylamino, diethylamino, n-propylamino, di-n-propylamino, isopropylamino, diisopropylamino, methylethylamino, methylisopropylamino, ethyl-n-propylamino, isobutylamino, and so forth.

The products of the present invention as above defined are typically viscous liquids or crystalline solids at room temperature. They are of low to moderate solubility in various organic solvents. They are useful as agents to control the growth of bacterial and fungal organisms such as the causative agents of various plant diseases, for example, apple scab, potato late blight, and the like. Representative compounds of the present invention include:

(2-chloro-4-n-butyl-phenoxy)bis(2-methylimidazol-1-yl)-phosphine oxide,
(2-chloro-4-t-butyl-phenoxy)bis(2-ethyl-imidazol-1-yl)-phosphine sulfide,
(2-chloro-4-t-butyl-phenoxy)diimidazol-1-ylphosphine oxide,
(4-chlorophenoxy)(4-chlorophenyl)imidazol-1-ylphosphine oxide,
(4-chlorophenoxy)(dimethylamino)imidazol-1-ylphosphine oxide,
(2,4,5-trichlorophenoxy)(dimethylamino)imidazol-1-ylphosphine oxide,
(3-bromo-5-methoxyphenoxy)(methylisopropylamino)-(2-ethylimidazol-1-yl)phosphine sulfide,
(2-chloro-4-nitrophenoxy)(methylamino)imidazol-1-ylphosphine oxide,
(2-bromo-4-cyanophenoxy)(diethylamino)imidazol-1-ylphosphine oxide,
(2,6-dimethyl-4-cyanophenoxy)bis(2-ethylimidazol-1-yl)phosphine sulfide,
(2-chloro-4-methylphenylthio)diimidazol-1-ylphosphine sulfide,
(4-cyanophenylthio)(dimethylamino)(2-methylimidazol-1-yl)phosphine oxide,
(4-bromophenylthio)(4-bromophenyl)imidazol-1-ylphosphine sulfide,
(4-isopropoxyphenoxy)(isopropylamino)(2-n-butylimidazol-1-yl)phosphine oxide,
(2,4,5-trichlorophenoxy)(n-butylamino)imidazol-1-ylphosphine sulfide, and
(2-chloro-4-t-butyl-phenylthio)(ethylamino)imidazol-1-ylphosphine oxide.

The products of the present invention are prepared by introduction of one or more of the requisite imidazolyl

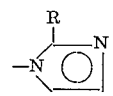

moieties into a phosphorus containing compound. The introduction is achieved by reaction of an imidazole compound of the formula

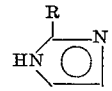

with an appropriate phosphorus containing reactant.
The identity of the latter reactant is dependent upon the number of imidazolyl moieties to be introduced.

Where a product of Formula I is desired, the phosphorus containing reactant employed is of the formula:

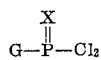

and where a product of Formula II is desired, the phosphorus containing reactant is of the formula:

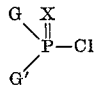

Regardless of the identity of the phosphorus containing reactant, the reaction of it with the imidazole reactant is carried out in the presence of a hydrogen chloride acceptor, such as a tertiary amine or an excess amount of the imidazole reactant. Furthermore, the reaction of imidazole reactant and phosphorus containing reactant is conveniently carried out in the presence of an inert liquid reaction medium. Suitable such media include aromatic hydrocarbons, such as benzene and toluene; and ethers, such as 1,2-dimethoxyethane, diethyl ether, and tetrahydrofuran. The reaction goes forward under temperatures of a wide range, such as from 0° to 100° C., but is preferably carried out at temperatures of from 20° to 60° C. The reaction results in the preparation of the desired product of either Formula I or II and of hydrogen chloride byproduct, which byproduct appears in the reaction medium as the reaction product of the hydrogen chloride acceptor—the hydrogen chloride addition salt when a tertiary amine or excess imidazole reactant is employed as the acceptor. The reaction goes forward when employing the reactants and hydrogen chloride acceptor in any amounts; however, the reactants are consumed in amounts representing equimolecular proportions and the employment of such amounts is preferred.

In carrying out the reaction, the reactants and hydrogen chloride acceptor are contacted with one another. The contacting is generally carried out by adding one reactant to the other reactant in a reaction medium containing the other reactant and the hydrogen chloride acceptor. Generally, the reaction goes to completion with the completion of the contacting of the reactants; however, it is sometimes preferred to permit the reaction mixture to stand for a period of time to assure completion of the reaction. Following any such period, the product is conventionally separated and recovered from the reaction mixture. The reaction mixture can be filtered to separate the byproduct hydrochloride salt. The solvent can then be removed from the filtrate by evaporation under subatmospheric pressure to leave the product as a residue. If desired, the product can be purified in conventional procedures; however, it is not necessary that such purification be carried out.

In an alternate method, the products of Formula II wherein G′ represents loweralkylamino are prepared by a modification of the foregoing method. In this modification, a single imidazolyl moiety is introduced into a precursor of the formula

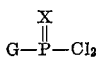

whereby there is obtained a compound of the formula

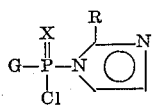

This compound is then reacted further with a loweralkylamine (instead of a further portion of imidazole compound as in the preparation of product of Formula I) to introduce the loweralkylamino substituent on phosphorus, thereby obtaining the desired final product of Formula II wherein G′ represents loweralkylamino. Good results are obtained when employing, in the first reaction of this method, equimolecular proportions of imidazole compound, the phosphorus containing compound, and hydrogen chloride acceptor. In the second reaction, good results are obtained when employing equimolecular proportions of the previously obtained compound:

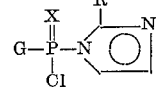

the loweralkylamine reactant, and a hydrogen chloride acceptor. An excess amount of the loweralkylamine reactant can be employed. In other respects than the preferred amounts to be employed, the reactions are carried out in accordance with the general method of which this is an alternate.

The following examples illustrate the present embodiment of the invention and will enable those skilled in the art to practice the same.

EXAMPLE 1.—(2 - CHLORO - 4 - t - BUTYL - PHENOXY)(DIMETHYLAMINO) - IMIDAZOL - 1 - YLPHOSPHINE SULFIDE

O - (2 - chloro - 4 - t - butyl - phenyl)phosphorodichloridothioate (227.5 grams; 0.716 mole) is mixed with 2 liters of benzene. The mixture is stirred and imidazole (97.6 grams; 1.432 moles) added portionwise over a period of 5 hours. The reaction mixture during the addition is maintained at a temperature of about 25°–30° C. Following the 5-hour period, the reaction mixture is held at room temperature, with stirring, for an additional period of twelve hours. At the end of this time, the reaction mixture is filtered to separate imidazole hydrochloride byproduct, which is then washed with 500 milliliters of benzene, and the filtrate and wash combined. The combined filtrate and wash (representing about 0.716 mole of O-(2-chloro-4-t-butyl-phenyl)imidazol-1-ylphosphorochloridothioate) is cooled with stirring to 0°–5° C. and dimethylamine (68.2 grams; 1.5 moles) added over a 5-hour period. The reaction mixture is maintained during the addition at the 0°–5° C. temperature range. After the addition, the reaction mixture is held at the same temperature for an additional 8 hours, with stirring. The reaction mixture is then filtered to separate the dimethylamine hydrochloride byproduct and the benzene removed by evaporation under subatmospheric pressure to obtain the desired (2-chloro-4-t-butyl-phenoxy)(dimethylamino) imidazol-1-ylphosphine sulfide product. (2-chloro-4-t-butyl-phenoxy)(dimethylamino)imidazol-1-ylphosphine sulfide has a molecular weight of 347.8.

EXAMPLE 2. — (4-BROMOPHENOXY)(DIMETHYLAMINO)IMIDAZOL - 1 - YLPHOSPHINE SULFIDE

O-(4 - bromophenyl)phosphorodichloridothioate (123 grams; 0.4 mole) is mixed with 500 milliliters of benzene. Thereafter dimethylamine (36 grams; 0.8 mole) is added portionwise over a period of 4 hours, the addition being carried out with the reaction mixture at a temperature of 30°–32° C. After the completion of the addition, the reaction mixture is held with stirring at room temperature for about 15 hours. The reaction mixture is then filtered to remove dimethylamine hydrochloride byproduct which is subsequently washed with 100 milliliters of benzene. The filtrate and wash are combined and imidazole (56.0 grams; 0.8 mole) added portionwise to the combined filtrate and wash. The addition is carried out at room temperature over a 3 hour period. After this addition, the reaction mixture is stirred at room temperature for an additional 12 hours. Insoluble imidazole hydrochloride byproduct is removed by filtration and washed. The filtrate and wash are combined and benzene removed by evaporation under subatmospheric pressure to obtain the desired (4-bromophenoxy) (dimethylamino)imidazol-1-ylphosphine sulfide product as a residue. The product residue is mixed with 500 milliliters of carbon tetrachloride, the mixture filtered, and the carbon tetrachloride removed by evaporation under subatmospheric pressure to obtain the product. (4-bromophenoxy)(dimethylamino)imidazol - 1 - ylphosphine sulfide has a molecular weight of 336.3.

EXAMPLE 3.—(2-CHLORO-4-t-BUTYL-PHENOXY) METHYLAMINO(2 - ETHYLIMIDAZOL - 1-YL) PHOSPHINE SULFIDE

O-(2-chloro-4-t - butyl - phenyl)phosphorodichloridothioate (227.5 grams; 0.716 mole) is dissolved in 1.2 liters of benzene. The mixture is thereafter stirred and cooled and maintained at a temperature ranging from 0° to 5° C. While maintaining the reaction mixture at this temperature, monomethylamine (49.0 grams; 1.58 moles) is added over a two hour period while continuing with stirring. Following the two hour period, the reaction mixture is held at from 0° C. to 5° C., with stirring, for an additional period of sixteen hours. At the end of this time, the reaction mixture is filtered to separate the insoluble methylamine hydrochloride which is then washed with 500 milliliters of benzene. The filtrate and wash are combined and concentrated by vacuum evaporation. The concentrate is then dissolved in one liter of n-hexane, the resulting mixture is filtered, and the filtrate is evaporated to give O-(2-chloro-4-t-butylphenyl)-N-methylphosphoramidochloridothioate.

To a solution of 98.5 grams (0.316 mole) of the thus obtained O-(2-chloro-4-t-butylphenyl)-N-methylphosphoramidochloridothioate in 200 milliliters of 1,2-dimethoxyethane is added, with stirring, a solution of 31 grams (0.316 mole) of 2-ethylimidazole, 56 milliliters (0.4 mole) of triethylamine and 200 milliliters of 1,2-dimethoxyethane in a dropwise fashion while maintaining the entire reaction mixture at room temperature. After the addition is complete, the reaction mixture is stirred at about 85° C. for four hours. Thereafter, 500 milliliters of 1,2-dimethoxyethane are added to the reaction mixture. The insoluble triethylamine hydrochloride is removed by filtration. The filtrate is concentrated and the concentrate purified through three crystallizations from a benzene:cyclohexane (1:1) mixture to give the desired (2-chloro-4-t-butyl-phenoxy) methylamino(2-ethylimidazol - 1 - yl)phosphine sulfide product melting at from 110° to 111° C.

EXAMPLE 4.—(2,4 - DICHLOROPHENOXY)ISOPROPYLAMINOIMIDAZOL - 1 - YLPHOSPHINE SULFIDE

A solution of 271 grams (0.85 mole) of O-(2,4-dichlorophenyl)phosphorodichloridothioate is dispersed in 1500 milliliters of benzene and the resultant solution is stirred at a temperature of from 0° C. to 5° C. Over a three hour period 150 milliliters (1.75 moles) of isopropylamine is added dropwise to the stirred solution. is stirred for 16 hours while maintaining the temperature at from 0° C. to 5° C. and thereafter the reaction mixture is refluxed for 1 hour. 500 milliliters of benzene are added to the mixture, the insoluble isopropylamine hydrochloride is filtered and removed, and the remaining filtrate is concentrated by evaporation to give O-(2, 4-dichlorophenyl)-N - isopropylphosphoramidochloridothioate as a crude residue which is recrystallized twice from n-hexane. This product has a melting point of 51° C.

A solution of 64 grams (0.2 mole) of O-(2,4-dichlorophenyl) - N - isopropylphosphoramidochloridothioate in 200 milliliters of 1,2-dimethoxyethane is stirred and to it is added dropwise over a 2 hour period at room temperature a solution of 14 grams (0.2 mole) of imidazole, 35 milliliters (0.25 mole) of triethylamine and 100 milliliters of 1,2-dimethoxyethane. After the addition has been completed, the reaction mixture is stirred at from 55° C. to 60° C. for 17 hours. Thereafter, an additional 250 milliliters of 1,2-dimethoxyethane is added to the reaction mixture, the insoluble triethylamine hydrochloride is filtered and removed, and the filtrate is concentrated. The concentrate is crystallized in cyclohexane to give the desired product (2,4-dichlorophenoxy)isopropylaminoimidazol - 1-ylphosphine sulfide product melting at from 92° to 99° C.

Other representative products prepared in accordance with the foregoing teachings and examples, are set forth in the following table. The symbol "M.P." is employed as an abbreviation of the term melting point, and the symbol "m. wt." as an abbreviation of the term molecular weight. The identity of the products is confirmed by elemental analysis.

From (2,4,5-trichlorophenoxy)dichlorophosphine sulfide and imidazole, (2,4,5-trichlorophenoxy)diimidazol-1-ylphosphine sulfide, a viscous liquid having a m. wt. of 395.6.

From (2,4,5-trichlorophenoxy)dichlorophosphine sulfide, imidazole, and dimethylamine, (2,4,5-trichlorophenoxy)(dimethylamino)imidazol-1-ylphosphine sulfide, M.P. 94°–95° C.

From (p-bromophenoxy)dichlorophosphine oxide and 2-ethylimidazole, (p-bromophenoxy)bis(2-ethylimidazol-1-yl)phosphine oxide, M. Wt. 409.2.

From (2 - chloro-4-t-butyl - phenoxy)dichlorophosphine oxide, imidazole, and dimethylamine, (2-chloro-4-t-butylphenoxy)(dimethylamino)imidazol-1-ylphosphine oxide, a viscous liquid having a M. Wt. of 331.8.

From (m-nitrophenylthio)dichlorophosphine sulfide and imidazole, (m-nitrophenylthio)diimidazol-1-ylphosphine sulfide, M. Wt. 351.3.

From (2-chloro-4-t-butyl-phenylthio)dichlorophosphine sulfide and imidazole, (2-chloro-4-t-butyl-phenoxy)diimidazol-1-ylphosphine sulfide, M. Wt. 364.8.

From (p-isopropoxyphenoxy)dichlorophosphine oxide, imidazole, and 2-isobutylimidazole, (p-isopropoxyphenoxy)imidazol-1-yl-(2-isobutylimidazol-1-yl)phosphine oxide, M. Wt. 388.5.

From (m-nitrophenoxy)dichlorophosphine sulfide 2-methylimidazole, and di-n-propylamine, (m-nitrophenoxy)(di-n-propylamino)(2 - methylimidazol-1 - yl)phosphine sulfide, M. Wt. 382.4.

From (2,4,5-trichlorophenoxy)dichlorophosphine sulfide, imidazole, an N-n-butylmethylamine, (2,4,5-trichlorophenylthio)(N - n - butylmethylamino)imidazol-1-ylphosphine sulfide, a viscous liquid.

From (2,4,5-trichlorophenoxy)dichlorophosphine sulfide, imidazole, and diethylamine, (2,4,5-trichlorophenoxy)(diethylamino)imidazole - 1 - ylphosphine sulfide, M.P. 36°–42° C.

From (2 - chloro-4-t-butyl-phenoxy)dichlorophosphine oxide and 2-methylimidazol, (2-chloro-4-t-butyl-phenoxy)bis(2-methylimidazol-1-yl)phosphine oxide, M. Wt. 392.8.

From p - chlorophenyl(p-chlorophenylthio)chlorophosphine sulfide, and 2-ethylimidazole, p-chlorophenyl-(p-chlorophenylthio)(2-ethylimidazol-1-yl)phosphine sulfide, M. Wt. 414.4.

From (2 - chloro-4-t-butyl-phenoxy)dichlorophosphine sulfide, imidazole, and diethylamine, (2-chloro-4-t-butylphenoxy)(diethylamino)imidazol-1-ylphosphine sulfide, a viscous liquid having a M. Wt. of 375.8.

From (2 - chloro - 4-t-butyl-phenoxy)3,5 - dimethoxyphenylchlorophosphine sulfide and imidazole, (2-chloro-4-t - butylphenoxy)3,5-dimethyloxyphenylimidazol - 1 - ylphosphine sulfide, M. Wt. 350.9.

From (2 - chloro-4-t-butyl-phenoxy)dichlorophosphine oxide, imidazole, and diethylamine, (2-chloro-4-t-butylphenoxy)(diethylamino)imidazol-1-ylphosphine oxide a viscous liquid having a M. Wt. of 359.8.

From (2,4-dichlorophenoxy)dichlorophosphine sulfide and 2-methylimidazole, (2,4 - dichlorophenoxy)bis-(2-methylimidazol-1-yl)phosphine sulfide, M. Wt. 387.2.

From (p-nitrophenoxy)dichlorophosphine sulfide and 2-methylimidazole, (p-nitrophenoxy)bis(2-methylimidazol-1-yl)phosphine sulfide, M. Wt. 363.4.

From (2 - chloro-4-t-butyl-phenoxy)dichlorophosphine oxide, and imidazole, (2-chloro-4-t-butyl-phenoxy)-diimidazol-1-ylphosphine oxide, M. Wt. 364.8.

From O - (2,4 - dichlorophenyl)phosphorodichloridothioate and isopropylamine and 2-methylimidazole, (2,4-dichlorophenoxy)isopropylamino(2 - methylimidazol - 1-yl)-phosphine sulfide, M.P. 91° to 96° C.

From (2 - chloro-4-t-butyl-phenoxy)dichlorophosphine sulfide and 2-methylimidazole, (2-chloro-4-t-butyl-phenoxy)-bis(2-methylimidazole-1-yl)phosphine sulfide, M. Wt. 408.8.

From O - (2,4 - dichlorophenyl)phosphorodichloridothioate and isopropylamine and 2-ethylimidazole, (2,4- dichlorophenoxy)isopropylamino(2-ethylimidazol - 1 - yl) phosphine sulfide, M.P. 98°–102° C.

From O - (2-chloro-4-t-butyl-phenyl)phosphorodichloridothioate and isopropylamine and 2-methylimidazole, (2 - chloro-4-t-butyl-phenoxy)isopropylamino(2 - methylimidazol-1-yl)phosphine sulfide, a thick gum.

From O - (2-chloro-4-t-butyl-phenyl)phosphorodichloridothioate and isopropylamine and 2-ethylimidazole, (2-chloro-4-t-butyl-phenoxy)isopropylamino(2 - ethylimidazol-1-yl)phosphine sulfide, M.P. 93°–95° C.

From O - (2 - chloro-4-t-butyl-phenyl)dichloridophosphonate and isopropylamine and 2-ethylimidazole, (2-chloro-4-t-butyl-phenoxy)isopropylamino(2 - ethylimidazol-1-yl)phosphine oxide, M.P. 86°–91° C.

From O - (2-chlorophenyl)phosphorodichloridothioate and n-propylamine and 2-methylimidazole, (2-chlorophenoxy)-n-propylamino(2-methylimidazol - 1 - yl)phosphine sulfide, M. Wt. 331.7.

From O - (3-bromo-5-methoxyphenyl)dichloridophosphonate and isopropylamine and 2-ethylimidazole, (3-bromo-5-methoxyphenoxy)isopropylamino(2 - ethylimidazol-1-yl)phosphine oxide, M. Wt. 408.2.

As noted hereinabove, the products of the present invention are useful as agents to control the growth of bacterial and fungal organisms. In this capacity, they can be employed to control such organisms as powdery mildew, potato late blight, fire blight, rice blast, *Trichophyton mentagrophytes,* apple scab, bean mildew, potato scab, tomato early blight, *Cercosphora beticola, Staphylococcus aureus, Aspergillus terreus, Candida pelliculosa, Rhizopus nigricans,* and *Bacillus subtillis.*

When a product of the present invention is employed for its bactericidal and fungicidal properties, the unmodified product can be utilized. However, the present invention also encompasses the utilization of the product together with an adjuvant. For example, the product can be dispersed on a finely divided solid and the resulting preparation employed as a dust. Also, a product of the present invention, or a composition comprising a product of the present invention and a finely divided solid, can be dispersed in water with the aid of a wetting agent and the resulting aqueous suspension employed as a spray. In other procedures, a product according to the present invention can be employed as the constituent of organic liquid compositions, oil-in-water or water-in-oil emulsions, or water dispersions, with or without the addition of a wetting, dispersing, or emulsifying agent. Good results are obtained when employing compositions containing bactericidal and fungicidal amounts of one or more of the active compounds. Generally, compositions are employed which contain from 25 to 10,000 parts of one or more of the active compounds per million parts by weight.

In representative operations, a stand of cucumber plants sprayed with an aqueous composition containing as sole fungicidal agent 150 parts of (2,4,5-trichlorophenoxy)(dimethylamino)imidazol-1-yl-phosphine sulfide per million parts by weight of total composition are completely protected against a subsequent challenge with powdery mildew. Another stand of cucumber plants left untreated to serve as checks develop a severe infestation of powdery mildew when similarly challenged.

In other representative operations, bacteriological culture media each separately containing 0.05 percent, by weight, of (2,4,5 - trichlorophenoxy)diimidazol-1-ylphosphine sulfide gives 100 percent kill and control of the respective culture, namely, *Aspergillus terreus, Pullularia pullulans,* and *Rhizopus nigricans.*

In further operations, (2,4-dichlorophenoxy)-isopropylaminoimidazol-1-ylphosphine sulfide gives substantially complete controls and kills of bean mildew when applied to plants infested with the causative agent thereof in a composition as the sole toxicant at a concentration of 150 parts per million parts, by weight.

The starting compounds represented by the formula

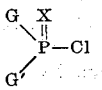

are known compounds and can be prepared by reacting together substantially equimolecular proportions of a compound of the formula

and a compound of the formula

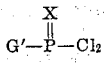

preferably in an inert organic solvent and in the presence of a hydrogen halide acceptor at a temperature of from 35° to 80° C.

The starting compounds represented by the formula

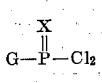

are also known compounds. They are prepared by reacting the phosphite of the formula

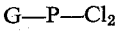

with substantially equimolecular proportions or an excess of phosphorus thiochloride or phosphorus oxychloride generally at temperatures greater than 120° C. until the evolution of phosphorus trichloride is complete. The reaction mixture is then distilled under reduced pressure to separate the product as a viscous liquid. A similar reaction prepares the corresponding

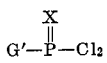

compounds.

What is claimed is:

1. The compound corresponding to the formula

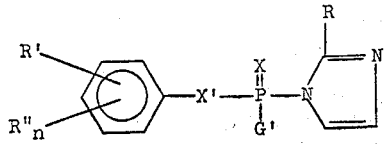

wherein X and X' represent oxygen or sulfur; R represents hydrogen or loweralkyl of from 1 to 4 carbon atoms; R' represents bromo, chloro, cyano, nitro or loweralkoxy of from 1 to 4 carbon atoms; R" represents bromo, chloro or loweralkyl of from 1 to 4 carbon atoms with *n* representing the integer 0, 1 or 2; and G' represents N-loweralkylamino or N,N-diloweralkylamino of 1 to 4 carbon atoms.

2. The compound of claim 1 which is (2-chloro-4-t-butyl-phenoxy)diethylaminoimidazol-1-ylphosphine oxide.

3. The compound of claim 1 which is (2-chloro-4-t-butyl-phenoxy)dimethylaminoimidazol-1-ylphosphine sulfide.

4. The compound of claim 1 which is (2-chloro-4-t-butyl-phenoxy) isopropylamine(2 - methylimidazol-1-yl)-phosphine sulfide.

5. The compound of claim 1 which is (2-chloro-4-t-butyl-phenoxy)isopropylamino(2-ethylimidazol-1-yl)-phosphine sulfide.

References Cited

UNITED STATES PATENTS

| | | | |
|---|---|---|---|
| 3,111,525 | 11/1963 | Meltzer et al. | 260—309 |
| 3,111,526 | 11/1963 | Koopmans et al | 260—309 |
| 3,227,728 | 1/1966 | Parts | 260—309 |
| 3,359,273 | 12/1967 | Nielsen et al. | 260—309 |

OTHER REFERENCES

Cramer et al.: Chem. Ber., vol. 94, pp. 1612–21 (1961).
German printed application 1,113,937 (1961).

HENRY R. JILES, Primary Examiner
N. TROUSOF, Assistant Examiner

U.S. Cl. X.R.

260—959, 960; 424—273

PO-1050
(5/69)

UNITED STATES PATENT OFFICE
CERTIFICATE OF CORRECTION

Patent No. 3,519,639            Dated    7 July 1970

Inventor(s)   Paul B. Budde and Henry Tolkmith

It is certified that error appears in the above-identified patent and that said Letters Patent are hereby corrected as shown below:

In column 5 please insert the following after the last word in line 54 (solution.) and before the first word in line 55 (is):

-- After the addition is complete the reaction mixture --

Signed and sealed this 27th day of April 1971.

(SEAL)
Attest:

EDWARD M. FLETCHER, JR.          WILLIAM E. SCHUYLER, JR.
Attesting Officer                Commissioner of Patents